(12) United States Patent
Straßer

(10) Patent No.: US 12,334,794 B2
(45) Date of Patent: Jun. 17, 2025

(54) EXTERNALLY EXCITED ELECTRIC MACHINE

(71) Applicant: AUDI AG, Ingolstadt (DE)

(72) Inventor: Roman Straßer, Gaimersheim (DE)

(73) Assignee: AUDI AG, Ingolstadt (DE)

(*) Notice: Subject to any disclaimer, the term of this patent is extended or adjusted under 35 U.S.C. 154(b) by 147 days.

(21) Appl. No.: 18/163,803

(22) Filed: Feb. 2, 2023

(65) Prior Publication Data

US 2023/0246510 A1    Aug. 3, 2023

(30) Foreign Application Priority Data

Feb. 3, 2022  (DE) .......................... 102022102602.7

(51) Int. Cl.
| | | |
|---|---|---|
| *H02K 5/14* | (2006.01) | |
| *H01R 39/38* | (2006.01) | |
| *H01R 39/59* | (2006.01) | |
| *H01R 39/60* | (2006.01) | |

(52) U.S. Cl.
CPC ............ *H02K 5/148* (2013.01); *H01R 39/381* (2013.01); *H01R 39/59* (2013.01); *H01R 39/60* (2013.01)

(58) Field of Classification Search
CPC ...... H02K 5/148; H01R 39/381; H01R 39/59; H01R 39/60
See application file for complete search history.

(56) References Cited

FOREIGN PATENT DOCUMENTS

| | | | |
|---|---|---|---|
| DE | 69829791 T2 | 3/2006 | |
| DE | 102017006277 A1 | 1/2018 | |
| DE | 102017217335 A1 * | 3/2019 | ............ H01R 39/59 |
| DE | 102018132050 B3 | 2/2020 | |
| DE | 202020101256 U1 | 3/2020 | |
| EP | 2429045 A2 * | 3/2012 | ............ H01R 39/40 |
| EP | 3159980 A1 | 4/2017 | |

* cited by examiner

*Primary Examiner* — Tulsidas C Patel
*Assistant Examiner* — Mohammed Ahmed Qureshi
(74) *Attorney, Agent, or Firm* — Seed IP Law Group LLP

(57) ABSTRACT

An externally excited electric machine comprises a rotor as well as a contact device having at least one sliding contact element positioned against a contact segment of the rotor for transmitting an exciter current, wherein the sliding contact element is integrated in an electromagnetic actuator, by which it can be controlled to move between a position lying against the contact segment and a position spaced apart from it.

17 Claims, 2 Drawing Sheets

EXTERNALLY EXCITED ELECTRIC MACHINE

BACKGROUND

Technical Field

Embodiments of the invention relate to an externally excited electric machine.

Description of the Related Art

In an externally excited electric machine, it is necessary to introduce an exciter current in the rotor for its operation. The rotor comprises a rotor winding, serving as the exciter winding for generating a magnetic exciter field, and it needs to be energized for this purpose. Usually a contact device in fixed position is used for this, having at least one sliding contact element, which lies against a contact segment of the rotor. The rotor rotates relative to the sliding contact element of fixed position, which slides against the surface of the contact segment, yet is in permanent electrical contact with the contact segment.

Such an externally excited electric machine can be used in an electrically operated motor vehicle, and be integrated for example in the front axle, where it serves as an auxiliary drive, while the main drive is integrated in the rear axle. The advantage of such an externally excited machine is that it can run similar to a freewheeling, without generating a torque in any form. Hence, the rotation of the rotor of this externally excited machine, when not actively operated, is not detrimental to the driving operation. However, even in this case, the contact device or the at least one sliding contact remains in permanent contact with the contact segment of the rotor, which nevertheless rotates when the vehicle is moving. The sliding contact is therefore exposed to a certain measure of wear also during this period, i.e., it becomes abraded, even when the externally excited electric machine is not energized, i.e., not working.

From DE 20 2020 101 256 U1 there is known an electric machine in which an elaborate mechanism is provided to lift a sliding contact element, comprising a movably mounted rod, which is coupled in movement with the sliding contact element, while this rod can swivel about a joint with the aid of an adjusting element. Although in this way the sliding contact element can be lifted up from its sliding abutment against the rotor when need be, the arrangement is still very elaborate in design.

BRIEF SUMMARY

Some embodiments provide an improved externally excited electric machine.

Some embodiments of the invention relate to an externally excited electric machine, comprising a rotor as well as a contact device having at least one sliding contact element positioned against a contact segment of the rotor for transmitting an exciter current.

In some embodiments, in an externally excited electric machine of the kind mentioned, the sliding contact element is integrated in an electromagnetic actuator, by which it can be controlled to move between a position lying against the contact segment and a position spaced apart from it.

In some embodiments, the sliding contact element is an integral component of an electromagnetic actuator, i.e., it is a piece thereof which is arranged movably in or on it. Thanks to an electromagnetic adjusting means of the actuator, the sliding contact element can be moved between two definite positions, in one position lying against the rotor segment in sliding manner, while in the other position being spaced apart from it. Since the actuator can be activated by a corresponding control device, the sliding contact element can consequently be lifted off and again placed in contact as needed.

Thanks to the direct integration of the sliding contact element in the actuator itself, a very compact structural unit results, which on the one hand is very easy to handle and therefore install, since the preconfigured actuator only needs to be put in the proper mounting position, and no additional mechanical coupling or adjusting elements need be provided, as in the prior art. On the other hand, since the sliding contact element is directly integrated in the actuator, it is possible to accomplish the direct adjusting movement of the sliding contact element also through the corresponding electromagnetic adjusting means, the adjustment path produced by the adjusting means being naturally designed accordingly, so that in the lifted position there is a definite minimum distance of the sliding contact element from the contact segment, which can be in the range of a few millimeters.

In some embodiments, an externally excited electric machine is consequently much more compact in regard to the sliding contact arrangement and therefore more simple in design than heretofore. In particular, the actuator provided as described herein can also be integrated in machines where relatively little design space is available, thanks to its compactness.

In one embodiment, at least two sliding contact elements can be provided, which are integrated in a common actuator and are movable jointly. That is, when two sliding contacts are required to impose the current in the exciter winding, these are moved simultaneously, and this occurs by virtue of a common actuator, in which the two sliding contact elements are integrated. Alternatively, it is also conceivable of course for each sliding contact element to be part of a separate actuator, and hence two separate, adjacent actuators are provided, for example, which are then separately activated, but they may be able to raise and lower the two sliding contact elements in synchronous manner.

The sliding contact element or elements are advisedly movable in linear manner by the common actuator or the respective actuator and radially relative to the axis of rotation of the rotor. That is, a simple linear radial adjusting movement occurs to bring the sliding contact element or elements between the two positions.

In one embodiment, the sliding contact element or elements can be received in a holder, which is received in a guide of the actuator and is movable in linear manner in this by an electromagnetic adjusting means. The holder serves for receiving and securing one or more sliding contact elements and is configured for example as a sleeve. Thanks to this holder, the corresponding linear guidance of the sliding contact element relative to the electromagnetic adjusting means occurs, for which the holder is received in a corresponding linear guide of the actuator, which is finally associated with the electromagnetic adjusting means. The electromagnetic adjusting means is or comprises one or more specifically energized coils, by which a magnetic field can be established to interact with the holder and move it in linear manner.

The guide may have an inner cross section deviating from a circular shape, in particular a polygonal or a quadratic or rectangular inner cross section, and the holder has an outer cross section of compatible shape. Thanks to these geometries deviating from a circular shape, a geometrical twist prevention is achieved, that is, the holder with sliding contact element cannot be turned inside the guide or the actuator.

The holder may be, as described, a sleeve. To ensure that the sliding contact element lies against or presses against the contact segment with a corresponding minimum pressure and it cannot lift off temporarily during operation, in one embodiment at least one spring element is received in the sleeve, clamping the sliding contact element or elements against the rotor, being braced on the one hand against a sleeve bottom and on the other hand against the sliding contact element or elements. Thanks to this spring element, a definite pressure force can be created, by which the sliding contact element is clamped against the rotor. At the same time, a very compact arrangement of sleeve, spring element and sliding contact element results, which can be easily integrated in the compact actuator.

In order to prevent the spring element from pushing a sliding contact element entirely out from the holder or sleeve when lifted, in one embodiment an end stop device can be provided, limiting the sliding out movement of the sliding contact element or elements produced by the at least one spring element. If the holder or sleeve is pulled into the actuator by the electromagnetic adjusting means, at the start of this movement the spring element will continue to push the sliding contact element out from the holder. This will last until the end stop device is engaged, and therefore until an end stop coupled with the sliding contact element or the spring element runs against a corresponding end stop on the holder or sleeve side, so that the sliding out movement is limited. Consequently, this will prevent the sliding contact element or the sliding brush from falling out of the sleeve.

Besides the externally excited electric machine itself, some embodiments relate to an electromagnetic actuator for an externally excited electric machine of the kind described above, comprising at least one integrated sliding contact element, which can be moved in linear manner by an electromagnetic adjusting means. The actuator can comprise only one sliding contact element, but it is also conceivable to provide two or more sliding contact elements in the common actuator housing, which are also movable jointly.

The sliding contact or contacts are received in a holder, which is received in a guide of the actuator and is movable in linear manner in this by the electromagnetic adjusting means. The guide may have an inner cross section deviating from a circular shape, in particular a polygonal, quadratic or rectangular inner cross section, and the holder has an outer cross section of compatible shape, thereby preventing a twisting of the holder relative to the actuator housing.

The holder itself may be a sleeve, in which a spring element is received, pushing the sliding contact element or elements out from the sleeve, being braced on the one hand against a sleeve bottom and on the other hand against the sliding contact element or elements.

Finally, an end stop device may be provided, limiting the sliding out movement of the sliding contact element or elements produced by the spring element.

BRIEF DESCRIPTION OF THE SEVERAL VIEWS OF THE DRAWINGS

Further benefits and details will emerge from the embodiments explained below, as well as with the aid of the drawings.

DETAILED DESCRIPTION

Figure 1:
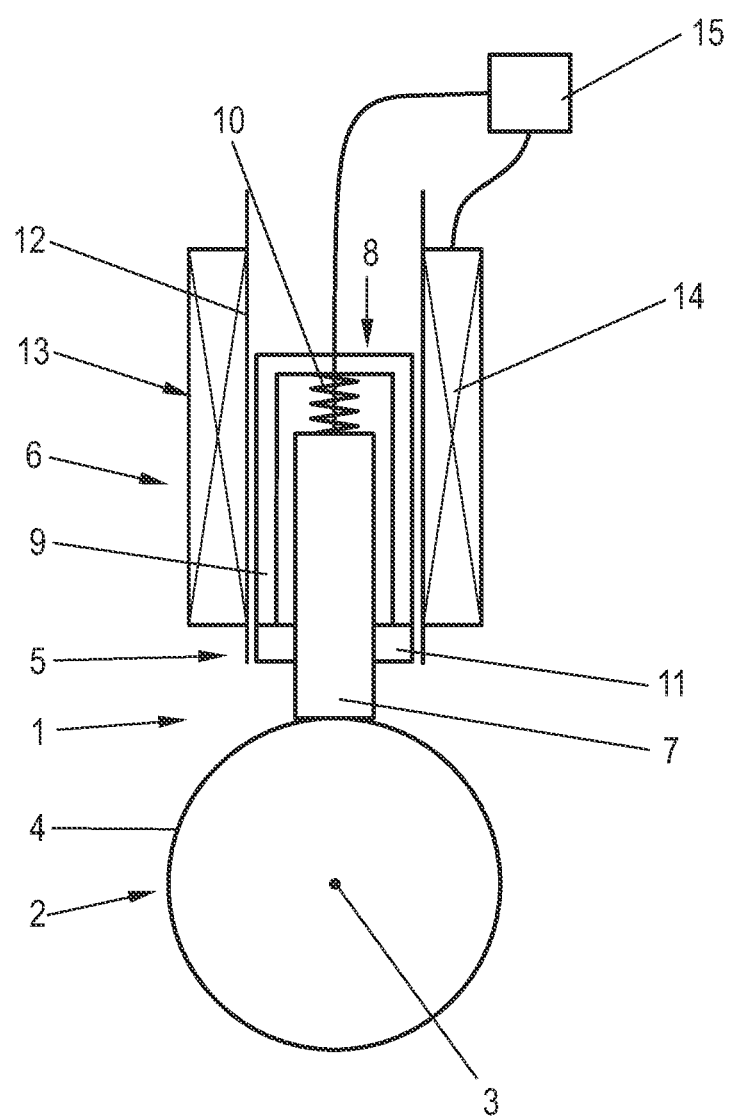
FIG. 1 shows a schematic representation of an externally excited synchronous machine in the form of a partial view, with an electromagnetic actuator having a sliding contact element in the sliding position.
Figure 2:
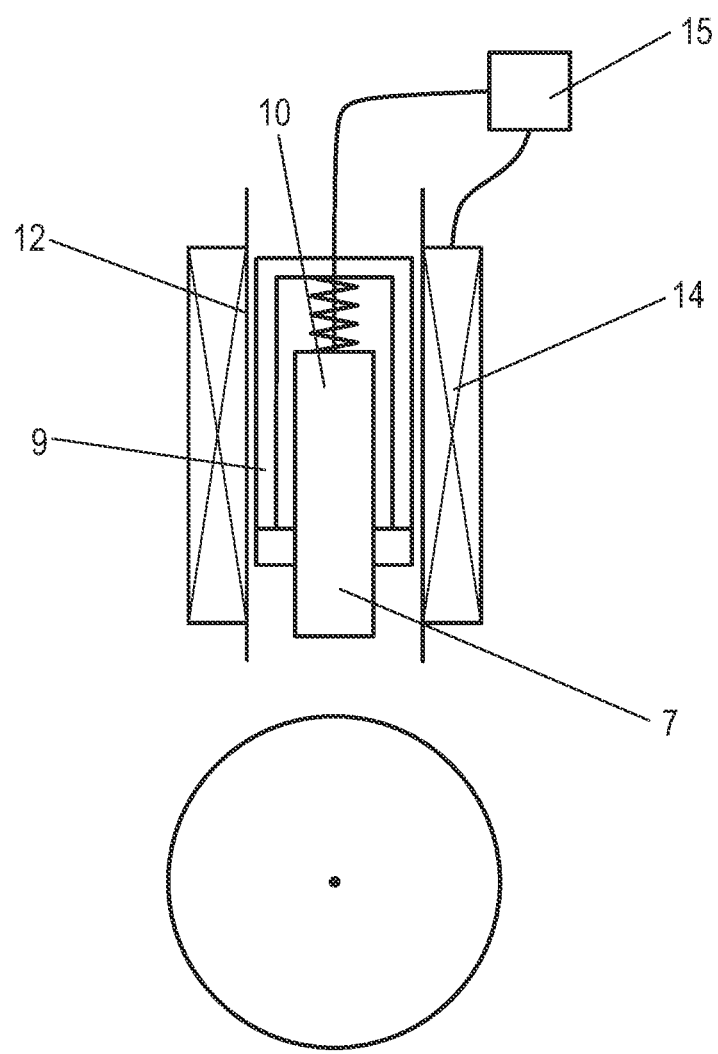
FIG. 2 shows the arrangement of FIG. 1 with a sliding contact element located in the lifted position.

FIG. 1 shows an externally excited electric machine 1 as described herein, i.e., a synchronous machine, also often called an externally excited synchronous machine (EESM). This comprises, besides a stator not shown, a rotor 2, which can turn about an axis of rotation 3. The rotor 2 has a contact segment 4, by which an electric current can be supplied to an exciter winding of the rotor 2, not otherwise shown. For this, a contact device 5 is provided, being integrated in an electromagnetic actuator 6 and able to be moved by this actuator, installed in fixed position in the electric machine, between two definite positions, namely, a contact position lying against the contact segment 4 and sliding along it, as shown in FIG. 1, and a lifted position, as shown in FIG. 2. The contact device 5 comprises a sliding contact element 7, usually also called a contact or sliding brush, which is received in a holder 8, here a sleeve 9, together with a spring element 10, such as a helical spring. The spring element 10 is braced on the one hand against the bottom of the sleeve 9 and on the other hand against the sliding contact element 7, so that it is spring-loaded continuously in the direction of the rotor 2, i.e., it lies with a defined pressure against the contact segment 4.

Moreover, an end stop device 11 is provided, which prevents the sliding contact element 7 from being forced out from the sleeve 9 by the spring element 10, or it can only be moved up to a maximum sliding out position from it, in order to prevent the sliding contact element 7 from falling out of the sleeve 9 when it is in the lifted position, shown in FIG. 2. If the sleeve 9 is moved out from the position against the rotor as shown in FIG. 2, the sliding contact element 7 will strike the contact segment 4 and compress the spring element 10, upon further movement of the sleeve 9, so that it clamps the sliding contact element 7 against the contact segment 4 with a definite force.

The sleeve 9 has an outer cross section deviating from a circle or cylinder shape or a deviating outer shape, being for example rectangular in cross section. In the actuator 6 it is received in a corresponding guide 12, having a compatible shape, and therefore having for example two oppositely placed guide surfaces or the like. This prevents the contact device 5 from turning inside the guide 12.

Adjacent to the guide 12 there is provided an electromagnetic adjusting element 13, comprising one or more coils 14, which can be energized accordingly in order to establish a magnetic field, which interacts with the metallic sleeve 9, so that this can be moved in definite manner between the two positions shown in FIGS. 1 and 2 in axial or linear manner within the guide 12.

Moreover, a control device 15 is provided, by which on the one hand the current is supplied that needs to be furnished across the sliding contact element 7 to the contact segment 4 or the exciter winding. On the other hand, the electromagnetic adjusting means 13 or the coil 14 is energized by this, in order to establish the required magnetic adjusting field.

Although only one sliding contact element 7 is shown in FIG. 1, being received in the sleeve 9, it is also conceivable of course to provide two parallel sliding contact elements 7 in the sleeve 9, if this is required in order to impose the exciter current. The two sliding contact elements 7 are insulated against each other. Since they are jointly received in the sleeve 9, each being prestressed by a spring element 10, they can also be moved jointly in forced movement between the two positions by a common adjusting means. Alternatively to the design of the actuator 6 with two sliding contact elements 7, it is also conceivable of course to place two actuators 6 in parallel, when need be, each one having a sliding contact element.

If the electric machine 1 is operated, the sliding contact element 7 or the sliding contact elements 7 will be in the sliding position, i.e., they in sliding manner against the contact segment or segments 4, and the exciter current can be imposed.

However, if the electric machine 1 is not operating, for example because it is not required when installed in a motor vehicle in order to provide a corresponding drive torque, the sliding contact 7 will be moved out from its sliding abutment, so that no further contact exists with the still rotating rotor 2 or the contact segment 4. Consequently, there is no further frictional stress and hence no further wear and tear. In order to achieve this condition, the adjusting means 13 is activated by the control device 15, i.e., the coil 14 is energized, so that the contact device 5 is as it were pulled into the actuator 6 by the magnetic field so generated, and the sliding contact element 7 is moved away from the rotor 2, i.e., spaced apart from it. The spring element 10 still pushes the sliding contact element 7 somewhat out from the sleeve 9 until this sliding out movement is limited by the end stop device 11.

If the electric machine 1 is to be further operated, the control device 15 will terminate the energizing of the coil 14, so that the contact device 5 is once again pushed out from the actuator housing and the sliding contact element 7 is once again brought into sliding abutment against the contact segment 4.

For this, it is conceivable to perform this sliding in movement of the contact device 5 in the actuator against another spring element, such as another helical spring, so that it is prestressed in this way. Once the energization of the coil 14 is ended in the position shown in FIG. 2 and the magnetic field of the coil 14 collapses, this further prestressed spring element can once again push the contact device 5 out from the actuator. Alternatively, this sliding out movement can also occur by an appropriate reversal of the direction of the magnetic field built up through the coil 14.

German patent application no. 10 2022 102602.7, filed Feb. 3, 2022, to which this application claims priority, is hereby incorporated herein by reference in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An externally excited electric machine, comprising:
a rotor;
a contact device having at least one sliding contact element positionable against a contact segment of the rotor for transmitting an exciter current,
wherein the sliding contact element is integrated in an electromagnetic actuator, by which the sliding contact element can be controlled to move between a position lying against the contact segment and a position spaced apart from the contact segment.

2. The externally excited electric machine according to claim 1, wherein at least two sliding contact elements are provided, which are integrated in a common actuator and are movable jointly, or which are integrated in separate actuators.

3. The externally excited electric machine according to claim 1, wherein the sliding contact element or elements are movable in linear manner by the actuator and radially relative to the axis of rotation of the rotor.

4. The externally excited electric machine according to claim 1, wherein the sliding contact element or elements are received in a holder, which is received in a guide of the actuator and is movable in linear manner in this by an electromagnetic adjusting device.

5. The externally excited electric machine according to claim 4, wherein the guide has an inner cross section that is not a circular shape, and the holder has an outer cross section of an identical shape to the inner cross section of the guide.

6. The externally excited electric machine according to claim 4, wherein the guide has a polygonal inner cross section, and the holder has an outer cross section of an identical shape to the polygonal inner cross section of the guide.

7. The externally excited electric machine according to claim 4, wherein the guide has a quadratic or rectangular inner cross section, and the holder has an outer cross section of an identical shape to the quadratic or rectangular inner cross section of the guide.

8. The externally excited electric machine according to claim 4, wherein the holder is a sleeve, in which at least one spring element is received, clamping the sliding contact element or elements against the rotor, being braced on the one hand against a sleeve bottom and on the other hand against the sliding contact element or elements.

9. The externally excited electric machine according to claim 8, wherein an end stop device is provided, limiting the sliding out movement of the sliding contact element or elements produced by the at least one spring element.

10. An electromagnetic actuator for an externally excited electric machine according to claim 1, comprising at least one integrated sliding contact element, which can be moved in linear manner by an electromagnetic adjusting device.

11. The electromagnetic actuator according to claim 10, wherein at least two sliding contact elements are provided, which are integrated jointly in the actuator and are movable jointly.

12. The electromagnetic actuator according to claim 10, wherein the sliding contact element or elements are received in a holder, which is received in a guide of the actuator and is movable in linear manner in this by the electromagnetic adjusting device.

13. The electromagnetic actuator according to claim 12, wherein the guide has an inner cross section deviating from a circular shape, and the holder has an outer cross section of compatible shape.

14. The electromagnetic actuator according to claim 12, wherein the guide has a polygonal inner cross section, and the holder has an outer cross section of compatible shape.

15. The electromagnetic actuator according to claim 12, wherein the guide has a quadratic or rectangular inner cross section, and the holder has an outer cross section of compatible shape.

16. The electromagnetic actuator according to claim 12, wherein the holder is a sleeve, in which a spring element is received, pushing the sliding contact element or elements out from the sleeve, being braced on the one hand against a sleeve bottom and on the other hand against the sliding contact element or elements.

17. The electromagnetic actuator according to claim 16, wherein an end stop device is provided, limiting the sliding out movement of the sliding contact element or elements produced by the at least one spring element.

* * * * *